United States Patent Office 2,839,588
Patented June 17, 1958

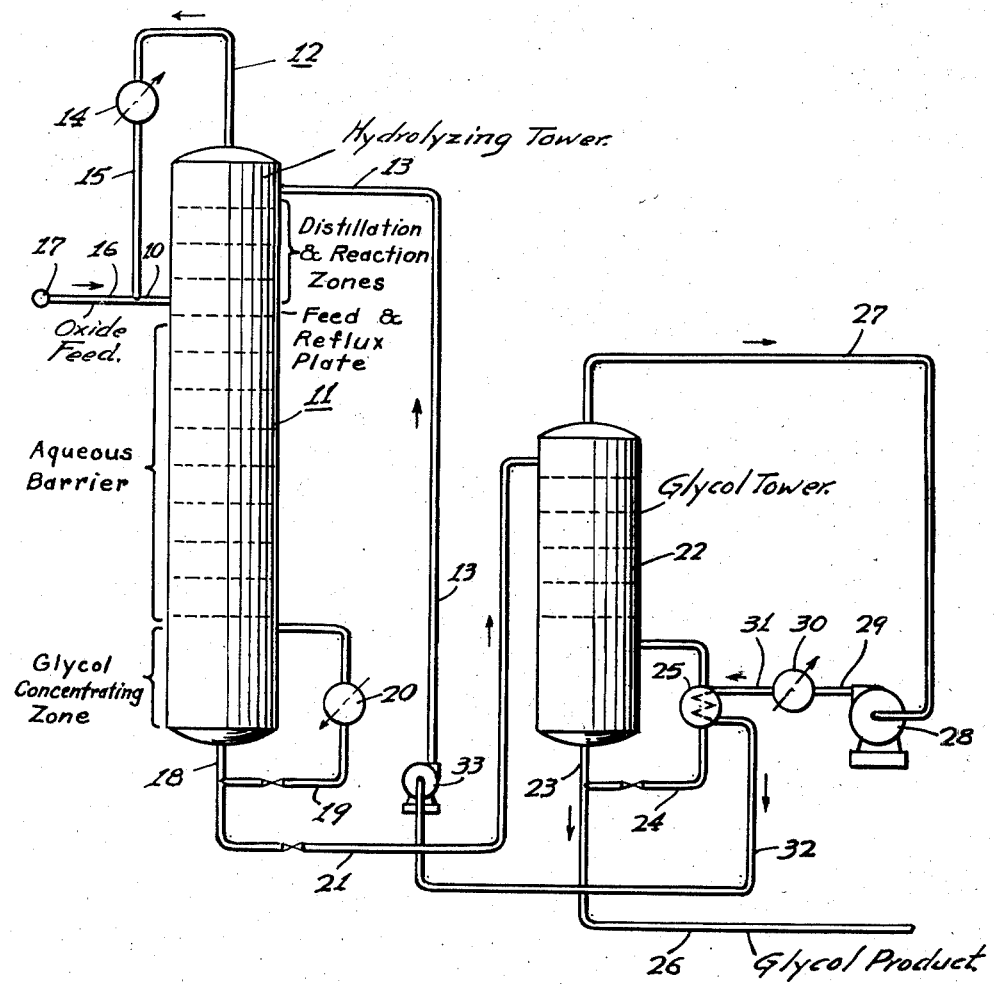

2,839,588

PREPARATION OF ALKYLENE GLYCOL

Almon S. Parker, Bethel, Pa., assignor to Gulf Oil Corporation, Pittsburgh, Pa., a corporation of Pennsylvania Application December 30, 1953, Serial No. 401,311

8 Claims. (Cl. 260—635)

This invention relates to a process of preparing glycols from olefin oxides, and has particular reference to the hydrolysis of low molecular weight olefin oxides to form mono-alkylene glycols.

The glycols can be synthesized by various methods such as the treatment of chlorhydrins with strong alkalis and the hydrolysis of olefin oxides. The latter method is a simple one but has been handicapped by the fact that the hydrolysis of especially the low molecular weight olefin oxides produces a product containing a substantial proportion of poly glycols. It has long been known that the relative proportion of poly-glycols in the glycol product can be substantially reduced by employing highly dilute aqueous solutions of the reactant olefin oxide to produce highly dilute aqueous solutions of the product glycol, but the problems of handling large solution volumes, obtaining reasonable reaction rates and separating glycol product from dilute aqueous solution have hampered recourse to this process. An acid catalyst, for example, sulfuric or phosphoric acid, will increase the reaction rate of these dilute solutions, but residual acid is difficult to remove entirely from the product and it is preferable to avoid its use.

In my improved process of hydrolyzing low-molecular-weight olefin oxides, the olefin oxide and water or a concentrated aqueous solution of olefin oxide can be fed to a reactor wherein the formed glycols are rapidly removed from the reaction zone and the contact of unreacted olefin oxide so that there is no substantial opportunity for olefin oxide and glycol to react and form poly-glycols even though the olefin oxide is hydrolyzed in relatively concentrated solution.

My invention comprises effecting the hydrolysis of an olefin oxide by contacting the oxide and water countercurrently in a plurality of interconnected distillation zones with high or total recycle of overhead oxide and of water to the hydrolyzing zones and rapid withdrawal from each zone of product glycol. Unreacted oxide is distilled overhead, condensed and recycled. Water is introduced as reflux in sufficient quantity to maintain a low concentration of glycol in the hydrolysis zone. The water flows countercurrently to oxide therein and carries product glycol from the zone.

In carrying out the hydrolysis, a 1,2 or 1,3 olefin oxide having between 2 and 5 carbon atoms per molecule is hydrolyzed to produce a corresponding mono-glycol solution in any significant concentration up to about 70 weight percent. The oxide solution that is fed to the hydrolyzing zone will contain at least enough water to produce the glycol solution; the concentration of the feed is not otherwise limited. The oxide concentration in the hydrolysis zone is determined by the hydrolysis rate and by the temperature and pressure of operation and can be varied over wide limits. The glycol concentration in the hydrolysis zone depends upon the ratio of the water recycled to oxide fed. In order to prevent formation of poly-glycols, the concentration of glycol in the reaction zone is maintained below 5 weight percent.

The hydrolysis is performed at such temperature and pressure in each zone that olefin oxide and water are distilled overhead into a successive distillation-and-reaction zone and aqueous glycol solution, substntially free of poly-glycols, is rapidly withdrawn. The product glycol in aqueous solution separates rapidly from the distillation-reaction zone because of the much lower vapor pressure of the glycol compared to that of the reactants. The aqueous glycol solution is then passed through a series of distillation zones which contain dilute aqueous solutions of glycol and in which any unreacted olefin oxide is stripped from the solution. The glycol in the stripping zone is maintained in low concentration and temperatures are kept below the range at which the glycol would be concentrated. Thus my invention also comprises the provision of an aqueous barrier between zones in which oxide and zones in which glycol are in substantial concentration, which barrier prevents substantial reaction between olefin oxide and glycol to form poly-glycols.

My process of hydrolyzing olefin oxides can effectively be combined with an improved method of concentrating the product glycol in which the distillate vapor from the concentrating zone is compressed to a pressure corresponding to the reaction temperature. The latent heat in this compressed vapor is used to separate the product glycol from water and the condensate is returned to the distillation-reaction zone.

The hydrolysis of olefin oxides by the process of the present invention is applicable to oxides having boiling points substantially below that of water and is especially effective when differences are large, at least 50° C., between the boiling points of the reactant oxide, water, and glycol product. Therefore it is best suited to the hydrolysis of lower-molecular-weight olefin oxides since here large differences in boiling point or vapor pressure exist. This renders the process especially useful since it is the corresponding lower-molecular-weight glycols, such as ethylene glycol and propylene glycol, that show the greatest tendency to react with further quantities of the corresponding oxide or other oxides to form respectively poly-glycols or mixed poly-glycols.

The alkylene oxides that are hydrolyzable to the corresponding mono-glycols by this improved process are those having inclusively from 2 to 5 carbon atoms per molecule in which the oxygen atom is linked to the 1,2 or 1,3 carbon atoms. In other words, the hydrolyzable alkylene oxides are those in which at most one carbon atom separates, in the molecule, the carbon atoms which are linked to the oxygen atom. These oxides include ethylene oxide, propylene oxide (methyl ethylene oxide) and trimethylene oxide (propylene oxide, 1,3) and also the following 4 and 5 carbon oxides: ethyl ethylene oxide, n-propyl ethylene oxide, 1,2-dimethyl ethylene oxide, 1,1-dimethyl ethylene oxide, 1-ethyl propylene oxide, 2-ethyl propylene oxide, isopropyl ethylene oxide, 2,2-dimethyl propylene oxide and the methyl trimethylene oxides, ethyl trimethylene oxides, and dimethyl trimethylene oxides.

The temperature and pressure range for effectively hydrolyzing an alkylene oxide and forming solely the mono-alkylene glycol will vary according to the vapor pressures of the selected oxide and product glycol. The hydrolysis of ethylene oxide is performed within a temperature range of 300° to 500° F. and a pressure range of 200 to 500 pounds per square inch. If an acid catalyst be employed, and a volatile acid catalyst, such as hydrochloric acid, is preferred, the hydrolysis temperature range can be lowered at least about 150° F. and preferably to between 130° and 250° F., and the pressure about 150 pounds (50 to 300 p. s. i. g.).

In the accompanying drawing which serves to illustrate but not to limit my invention, the single figure is a schematic flow diagram of a process of hydrolyzing olefin oxides according to a preferred embodiment of my invention.

An example of operation of the process of the present invention in which ethylene oxide is hydrolyzed to substantially only ethylene glycol is described with particular reference to the drawing.

An aqueous solution containing 36 percent by weight of ethylene oxide is introduced through line 10 into tower 11 which consists of a reaction column having a plurality of plates. The aqueous ethylene-oxide feed is introduced into an upper section of the tower and upon a feed-and-reflux plate wherein the aqueous solution is held at a boiling temperature of about 400° F. and a gauge pressure of about 300 pounds per square inch. Hydrolysis of ethylene oxide occurs on this plate and in the liquid phase on several superposed plates in the tower. Effluent vapors leave the tower 11 through line 12 and consist of an aqueous vapor mixture containing 36.2 percent by weight of ethylene oxide and substantially no ethylene glycol.

Water which has been originally introduced into the system with oxide feed is recycled from an ethylene glycol concentration system, hereinafter described, and is flowed at a temperature of about 400° F. through line 13 into the top of the tower 11. This recycled water and the small amount of water introduced with the oxide feed provide the water of hydrolysis and the large volume of water which acts, within the tower, as a barrier between the reacting ethylene-oxide solution of relatively high concentration and the product glycol solution and which leaves the tower with the hydrolysis product.

Vapors from line 12 containing 36.2 percent by weight of ethylene oxide are passed at a temperature of about 400° F. through a condenser 14 and from condenser 14 through line 15 to junction with an oxide-feed line 16 at which point the recycled condensate and oxide feed are mixed and flowed back through line 10 into the tower 11. The oxide feed flowing from a source 17 through the feed line 16 consists in the present example of a 35.5 weight percent aqueous solution of ethylene oxide.

Downflowing liquid from the feed and reflux plate contains 3.4 percent by weight of ethylene oxide and 2.6 percent by weight of ethylene glycol. The plurality of plates just beneath the reflux and feed plate strips the ethylene oxide to less than about 0.005 percent by weight without substantially increasing the concentration of the ethylene glycol. It is this section of the tower which constitutes a water barrier separating the upper section of the tower in which the ethylene oxide concentration is relatively high and the lower section of the tower in which the concentration of ethylene glycol can be initiated.

In the present example as illustrated by the drawing, the glycol solution is concentrated only to a slight degree in the bottom of the hydrolyzing tower and the rest of the concentrating is accomplished, for the purposes of flexibility, in a separate tower. However, evaporation of the glycol solution to relatively high concentrations can easily be accomplished in the tower 11 below the water barrier therein.

In the example shown, ethylene-glycol solution is concentrated in the lower section of tower 11 at a temperature of 428° F. and a pressure of 320 pounds per square inch gauge to a 3.3 weight percent glycol concentration and as such is withdrawn from the tower through line 18. A portion of the withdrawn solution is recycled to the tower through valved line 19 and reboiler 20, that is supplied with 400 pound steam. Aqueous solution of glycol is flowed from line 18 through valved line 21 and at a reduced pressure into a glycol tower 22 and upon an upper or top tray therein.

Liquid hydrolysis product descending through the distillation tower 22 is concentrated to form a 50 percent aqueous solution of ethylene glycol. The concentrated solution is withdrawn from the tower 22 through line 23 and a portion of the withdrawn solution is recycled from valved line 24 through a reboiler 25 and into a lower section of the tower 22. Glycol solution in the bottom of the tower 22 is maintained at a temperature of 375° F. and a gauge pressure of 142 pounds per square inch.

Aqueous solution of ethylene glycol in about 50 percent by weight concentration is withdrawn from line 23 through line 26 to means (not shown) for further concentration or direct employment of the glycol product.

Water vapor containing less than 0.1 weight percent of ethylene glycol flows from the top of the tower 22 at a temperature of 363° F. and a gauge pressure of 141 pounds per square inch through line 27 to the compressor 28. The compressed vapor flows from the compressor 28 through line 29 at a temperature of 490° F. to 500° F. and a gauge pressure of 243 pounds per square inch into a cooler 30 in which the temperature of the fluid is lowered to about 402° F. The cooled vapor flows from the cooler 30 through line 31 at a gauge pressure of 230 pounds per square inch and through reboiler 25 condensing in indirect contact with aqueous glycol solution being recycled through line 24. The condensate is flowed from line 31 and reboiler 25 at a temperature of 400° F. and a gauge pressure of 233 pounds per square inch through a line 32 to a pump 33 by which means the condensate is recycled through line 13 into the top of the hydrolyzing tower 11.

The hydrolysis of alkylene oxide and the concentration of product glycol can be accomplished in a single tower in which water vapors from the concentrating zone pass up through the hydrolysis zone and in which overhead vapors of water and small quantities of oxide are flowed through a vapor-recompression system for extraction of reboiler-heat followed by recycle of condensate to the hydrolysis zone. However, the system, herewith illustrated as a preferred embodiment of my invention, has much greater flexibility. For example, in those instances where the rate of hydrolysis of the oxide is insufficiently rapid at a temperature that suitably may be combined with a proper distillation temperature for concentration of the corresponding alkylene glycol, the hydrolyzation can be performed in a separate distillation column maintained at a different temperature and pressure.

Thus my process flexibly is adaptable to widely varying initial cost and operating cost situations, in addition to being adjustable to many variations in feed and desired product characteristics.

Having described my invention, I claim:

1. A process for preparing a mono-alkylene glycol substantially free of poly-glycol, the said process comprising introducing water and a hydrolyzable alkylene oxide having inclusively from 2 to 5 carbon atoms per molecule in which at most one carbon atom separates the carbon atoms which are linked to the oxygen atom, into a plurality of distillation-reaction zones maintained at an elevated temperature and pressure, effecting hydrolysis of the selected alkylene oxide in the distillation-reaction zones, distilling unreacted alkylene oxide and water from the distillation-reaction zones, flowing water countercurrently to distillate oxide in said zones to provide an aqueous barrier between zones in which oxide and zones in which glycol are in substantial concentration, condensing the overhead oxide and water vapors, recycling substantially the entire condensate to the distillation-reaction zones, withdrawing as distillate bottoms product an aqueous solution of mono-alkylene glycol from the said zones.

2. A process for the preparation of mono-alkylene glycol substantially free of poly-glycol, the said process comprising introducing water and a hydrolyzable alkylene oxide having inclusively from 2 to 5 carbon atoms per molecule in which at most one carbon atom separates the carbon atoms which are linked to the oxygen atom, into a plurality of distillation-reaction zones at sufficiently elevated temperatures and pressures to retain alkylene oxide in aqueous solution and effect hydrolysis of the alkylene oxide, distilling unreacted oxide and water overhead, flowing water countercurrently to distillate oxide to provide an aqueous barrier between zones in which oxide and zones in which glycol are in substantial concentration, condensing the overhead water and oxide vapors and recycling the entire condensate to the distillation-reaction zones, withdrawing as distillation bottoms alkylene glycol in aqueous solution from the distillation-reaction zones at such a rate that the solution concentration of glycol in the distillation-reaction zones will not exceed 5 weight percent.

3. A process for preparation of ethylene glycol substantially free of polyethylene glycol, the said process comprising introducing water and ethylene oxide into a plurality of distillation-reaction zones, effecting hydrolysis of the introduced ethylene oxide while simultaneously distilling water and unreacted ethylene oxide overhead, flowing water countercurrently to distillate oxide in the said zones to provide an aqueous barrier between zones in which oxide and zones in which glycol are in substantial concentration, condensing overhead vapors and recycling the condensate to the distillation-reaction zones, and withdrawing aqueous solution of ethylene glycol from the distillation reaction zones as a bottoms product.

4. The process of claim 3 in which water is separated from the aqueous glycol solution and is recycled to the distillation-reaction zones at such rate as to maintain the glycol concentration in the reaction zones at less than about 5 weight percent.

5. A process for the preparation of ethylene glycol substantially free of polyethylene glycol, the said process comprising: introducing water and ethylene oxide into a plurality of distillation-reaction zones at a temperature between about 300° and 500° F. and a gauge pressure between about 200 and 500 pounds per square inch and thereby effecting hydrolysis of ethylene oxide; simultaneously, to effect such hydrolysis distilling water and unreacted oxide overhead from the reaction zones; condensing overhead water and oxide vapors and recycling substantially the total condensate to the reaction zones; and withdrawing aqueous solution of ethylene glycol from the zones as distillation bottoms and recycling water separated from aqueous ethylene glycol solution and flowing the said water countercurrently to distillate oxide in the said zones at such a rate as to maintain the ethylene glycol concentration in the water in the distillation-reaction zones at less than about 5 weight percent and to provide an aqueous barrier between zones in which oxide and zones in which glycol are in substantial concentration.

6. A process for the preparation of monoalkylene glycol substantially free of poly-glycols, the said process comprising: introducing a hydrolyzable alkylene oxide having from 2 to 5 carbon atoms per molecule in which at most one carbon atom separates the carbon atoms which are linked to the oxygen atom in aqueous solution of at most about 50 weight percent conentration, into a plurality of distillation-reaction zones, maintaining the introduced alkylene oxide and water in the said zones at sufficiently elevated temperature and pressure to effect hydrolysis of oxide while distilling, from the reaction mixture, unreacted alkylene oxide and water overhead; condensing the distillate and recycling the condensate to the distillation-reaction zones; withdrawing aqueous solution of alkylene glycol from the said zones and fractionally distilling unreacted alkylene oxide from the solution; thereafter passing the glycol solution into distillation zones of different pressure than that of the distillation-reaction zones, concentrating alkylene glycol in the aqueous solution by distilling water therefrom, compressing aqueous distillate vapor, condensing said compressed distillate and employing the heat of condensation to concentrate the alkylene glycol, recycling the aqueous condensate to the distillation-reaction zones at the reaction pressure and flowing the said aqueous condensate countercurrently to distillate oxide in the said distillation-reaction zones at a rate such as to maintain a glycol concentration in the said zones of at most 5 weight percent and to provide an aqueous barrier between zones in which oxide and zones in which glycol are in substantial concentration.

7. A process for the preparation of mono-alkylene glycol substantially free of polyglycol, the said process comprising introducing water and an alkylene oxide having inclusively from 2 to 5 carbon atoms per molecule in which at most one carbon atom separates the carbon atoms which are linked to the oxygen atom and which boils at least 50° C. below the boiling point of water and is hydrolyzable to a mono-glycol boiling at least 50° C. above the boiling point of water, into a plurality of distillation-reaction zones, distilling the introduced water and oxide in the said zones, simultaneously effecting hydrolysis of the introduced alkylene oxide to form the corresponding mono-alkylene glycol, removing unreacted alkylene oxide and water as overhead distillate vapor, flowing water counter-currently to distillate oxide in the said zones to provide an aqueous barrier between zones in which oxide and zones in which glycol are in substantial concentration, condensing overhead vapors and recycling condensate to the distillation-reaction zones and withdrawing mono-alkylene glycol in aqueous solution from the distillation zones as bottoms product.

8. A process of preparing a mono-alkylene glycol substantially free of poly-glycol, the said process comprising: introducing into a plurality of distillation-reaction zones, a hydrolyzable alkylene oxide having from 2 to 5 carbon atoms per molecule, inclusive, in which at most one carbon atom separates the carbon atoms which are linked to the oxygen atom, in a concentration that will produce an aqueous glycol solution of at most about 70 weight percent concentration; maintaining the distillation-reaction zones at an elevated pressure and temperature sufficient, respectively, to hold introduced oxide in solution in water and to effect hydrolysis of oxide while distilling unreacted oxide and water from the said zones; recycling substantially the entire oxide- and water-condensate to the distillation-reaction zones; withdrawing, as distillation bottoms, an aqueous solution of mono-alkylene glycol from the distillation-reaction zones; evaporating water from the so-withdrawn solution of mono-alkylene glycol to obtain a concentrated aqueous mono-alkylene glycol solution as product; condensing the evaporated water and recycling it to the distillation-reaction zones and flowing it countercurrently to the distillate oxide in said zones at a rate such as to maintain in glycol concentration in the distillation-reaction zones of at most 5 weight percent, and to provide an aqueous barrier between zones in which oxide and zones in which glycol are in substantial concentration.

References Cited in the file of this patent

UNITED STATES PATENTS

| 2,095,496 | Gerg | Oct. 12, 1937 |
| 2,255,411 | Cohen et al. | Sept. 9, 1941 |
| 2,615,901 | McClellan | Oct. 28, 1952 |

OTHER REFERENCES

Curme et al., Glycols, 1952, pages 20, 21 and 25.